United States Patent
Nenoff et al.

(12) 
(10) Patent No.: US 6,482,380 B1
(45) Date of Patent: Nov. 19, 2002

(54) SILICOTITANATE MOLECULAR SIEVE AND CONDENSED PHASES

(75) Inventors: Tina M. Nenoff, Albuquerque, NM (US); May D. Nyman, Albuquerque, NM (US)

(73) Assignee: The United States of America as represented by the Department of Energy, Washington, DC (US)

( * ) Notice: Subject to any disclaimer, the term of this patent is extended or adjusted under 35 U.S.C. 154(b) by 144 days.

(21) Appl. No.: 09/717,034

(22) Filed: Nov. 22, 2000

(51) Int. Cl.$^7$ .............................. C01B 33/32; C02F 1/42; C02F 1/62
(52) U.S. Cl. ................. 423/326; 501/134; 501/154; 210/681; 210/682; 210/688
(58) Field of Search ................. 423/713, 326; 501/134, 154; 210/681, 682, 688

(56) References Cited

U.S. PATENT DOCUMENTS 5,591,420 A * 1/1997 Balmer ................. 423/700
5,935,552 A * 8/1999 Bedard ................. 423/326

* cited by examiner

*Primary Examiner*—David Sample
(74) *Attorney, Agent, or Firm*—James C. Durkis; Dickson G. Kehl; Paul A. Gottlieb

(57) ABSTRACT

A new microporous crystalline molecular sieve material having the formula $Cs_3TiSi_3O_{9.5} \cdot 3H_2O$ and its hydrothermally condensed phase, $Cs_2TiSi_6O_{15}$, are disclosed. The microporous material can adsorb divalent ions of radionuclides or other industrial metals such as chromium, nickel, lead, copper, cobalt, zinc, cadmium, barium, and mercury, from aqueous or hydrocarbon solutions. The adsorbed metal ions can be leached out for recovery purposes or the microporous material can be hydrothermally condensed to a radiation resistant, structurally and chemically stable phase which can serve as a storage waste form for radionuclides.

11 Claims, 1 Drawing Sheet

US 6,482,380 B1

SILICOTITANATE MOLECULAR SIEVE AND CONDENSED PHASES

The United States Government has rights in this invention pursuant to Contract Number DE-AC04-94AL85000 between the United States Department of Energy and Sandia Corporation.

BACKGROUND OF THE INVENTION

1. Field of the Invention

This invention relates to a new silicotitanate molecular sieve ion exchange material for the capture and immobilization of divalent cations from aqueous and/or hydrocarbon solutions, including elements such as radioactive strontium or industrial RCRA metal cations. The invention further relates to the ability to either recycle the captured metal for future use or to encapsulate the cation through thermal treatment of the molecular sieve to a condensed phase.

2. Description of the Prior Art

It is known that crystalline silicotitanates (CST; commercially available through UOP LLP, as IE-911) can selectively remove 100 ppm Cs and Sr cations from 5M $Na^+$ solutions over a broad pH range (1 to 14) and, because of this, they have been found effective to clean up radioactive $^{137}Cs$ and $^{90}Sr$ from waste tanks at the US Department of Energy Hanford waste tanks. To immobilize the Cs-loaded CSTs, there is used a combination of high activity waste and melting with borosilicate glass to create a glass log waste form which can be stored indefinitely. However, since titania induces crystallization and separation in borosilicate glass, the Cs-CST must be diluted to a few weight percent, thus increasing the volume and the cost of waste form production. It has already been shown by Y. Su, [Y. Su, et. al, MRS Conference Proceedings (Boston) "Evaluation of Cesium Silicotitanates as an Alternative Waste Form" p. 457 (1997)]. that a waste form that is more chemically durable than borosilicate glass logs can be generated by direct thermal conversion of Cs-CST. However, an improvement in the isolation of divalent radioactive and industrial waste remains quite desirable.

Therefore, an object of this invention is to provide a new type of inorganic molecular sieve materials. Another object is to provide inorganic materials that are mechanically and chemically stable and are free from the traditional problems associated with organic-based molecular sieves. A further object is to provide microporous compounds that can be used for radionuclides and industrial metals sorption. A still further object is to provide a molecular sieve that can be back-exchanged by acid wash to recover/recycle the sequestered metal cation. Still another object is to provide molecular sieves that can be thermally condensed to form leach resistant phases for radionuclide storage.

Additional objects, advantages, and novel features of the invention will become apparent to those skilled in the art upon examination of the following description, or will be learned by practice of the invention.

BRIEF SUMMARY OF THE INVENTION

There is now disclosed that the radionuclides $^{137}cesium$, and to a lesser extent $^{90}strontium$, as well as divalent cations of several metals can be selectively removed from solution using a crystalline silicotitanate (CST) ion exchanger, namely a Cs—Si—Ti—O phase. However, an improved divalent ion exchanger and its condensed counterpart phase have now been hydrothermally synthesized, characterized, evaluated, and described in this specification. The viability of the new materials for divalent sequestration and subsequent encapsulation is based on chemical, mechanical, and thermal stability, leachability, and ion exchange capabilities. The two novel Cs—Si—Ti—O phases are $Cs_3TiSi_3O_{9.5} \cdot 3H_2O$ (SNL-B), a porous phase which adsorbs the divalent cation metal, and $Cs_2TiSi_6O_{15}$ (SNL-A), a condensed stable form in which the metal is immobilized for storage purposes, if that is desired. The two phases are also identified by their crystallographic parameters: SNL-B, orthorhombic, unit cell parameters a=10.83 Å, b=7.43 Å and c=7.11 Å; SNL-A, monoclinic, Cc space group, unit cell parameters: a=12.998 (2) Å, b=7.5014 (3) Å, c=15.156 (3) Å, β=105.80 (3)°.

DETAILED DESCRIPTION OF THE INVENTION

There will now be described the synthesis and characterization of a completely new type of microporous inorganic molecular sieve material. The general chemical formula of this new material is $Cs_3TiSi_3O_{9.5} \cdot 3H_2O$ (SNL-B). The material has a net negatively charged framework comprised of silicon, titanium, and oxygen elements. The framework is charge balanced by the occlusion of cesium cations during its synthesis. The material has a strong affinity and selectivity for divalent cations, thus allowing the exchange of the cesium ion for other cations.

Figure 1:
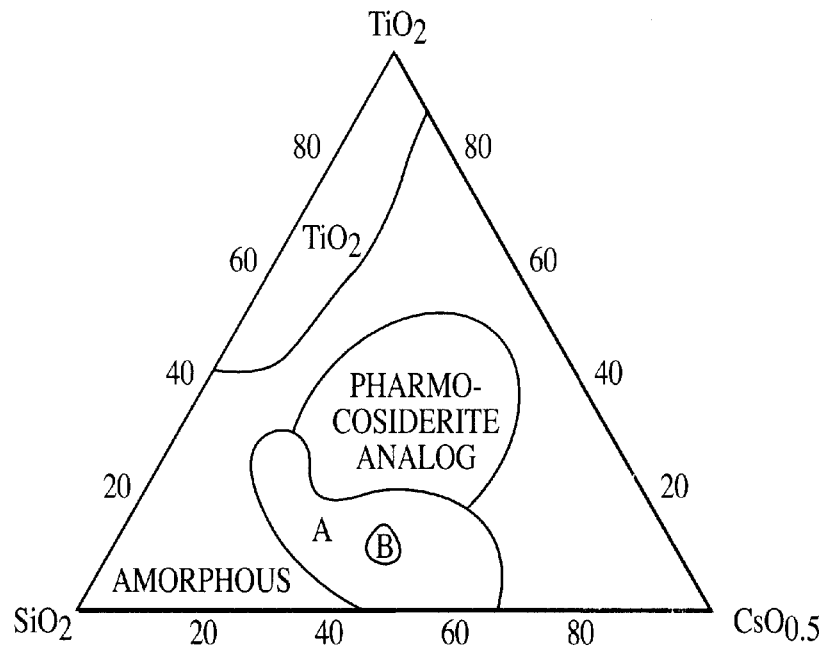
FIG. 1 is a phase diagram of the $CsO_{0.5}$—$TiO_2$—$SiO_2$ system which shows the proportions of cesium oxide, titania, and silica that can yield SNL-A and SNL-B under hydrothermal synthesis conditions.

The $CsO_{0.5}$—$TiO_2$—$SiO_2$ phase diagram shown in FIG. 1 delineates, inter alia, the various phases formed by the hydrothermal treatment of various concentrations of the components of the system and, more relevantly, the ranges of component concentrations that can yield the products of the invention, SNL-A and SNL-B. As can be seen in the diagram, the phases which are obtained by hydrothermal treatment of the proper concentrations of components at 120° C. for 5 days, include a compound analogous to pharmacosiderite, $TiO_2$ (anastase), and four previously unidentified phases, two of which are SNL-A and SNL-B. The rest of the diagram area is taken up by amorphous phases.

EXAMPLE 1

Microporous structure SNL-B was prepared by stirring together titanium isopropoxide (TIPT) and tetraethyl orthosilicate (TEOS). This mixture was then added dropwise to a 23 mL Teflon liner for a Parr pressure reactor containing 50% cesium hydroxide solution and amorphous titania. After stirring 30 minutes, water was added and the mixture was stirred for 30 minutes more. The final pH of the mixture was 12.5 and the final reactants stoichiometry was Cs:Ti:Si:$H_2O$=4:1:4:383. The loaded pressure reactor was placed in a 120° C. oven for two weeks. The product was collected by filtration and washed with hot water.

The amorphous titania was prepared by base-catalyzed hydrolysis of TIPT. Prior to use, it was characterized by TGA for water content, X-ray diffraction, and ICP for Ti content.

Ion exchange, for instance with $Sr^{++}$ ions, takes place without any framework distortion, as indicated by the X-ray diffraction spectrum of the ion-exchanged microporous phase. In the case of Sr, the microporous ion exchange material exhibited high selectivity with a distribution coefficient $K_d$>100,000 ml/g, i.e., no Sr detected in solution after contact. In contrast, a $K_d$=19 ml/g was measured for adsorption of $Na^+$ ions onto this phase. As intimated earlier, the microporous material of the invention, SNL-B, can be used to adsorb divalent cations of various industrial and natural metals, including copper, nickel, thorium, lead, chromium, cobalt, zinc, cadmiumn, barium, mercury, and the like.

EXAMPLE 2

Figure 2:
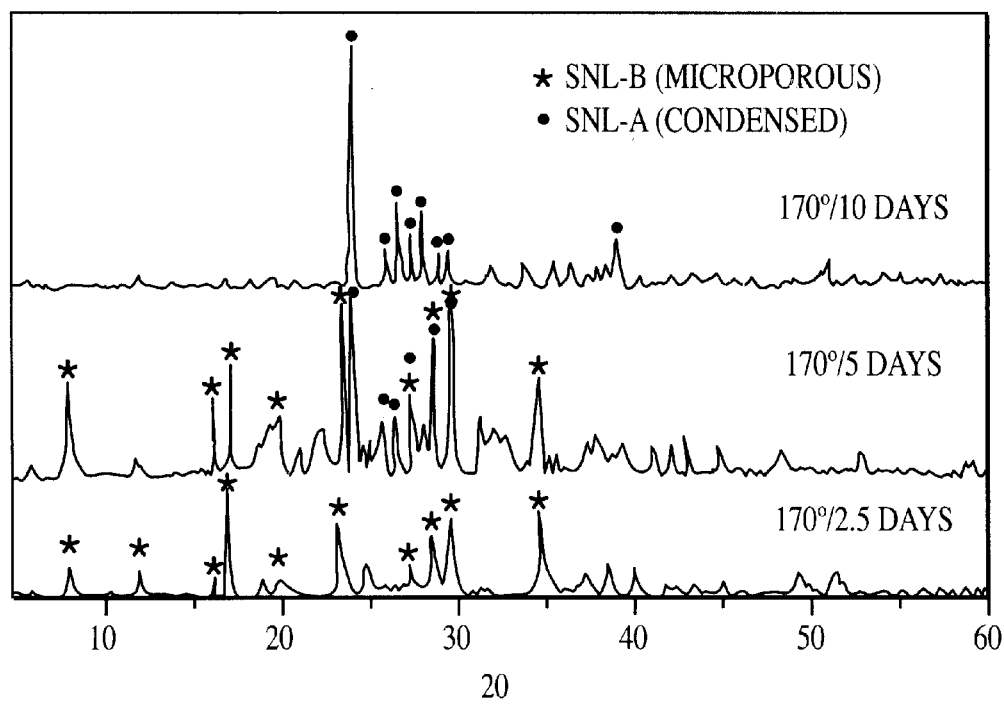
FIG. 2 illustrates the power diffraction patterns of both the microporous phase (SNL-B) and the condensed phase (SNL-A) of the silicotitanates of the invention.

Three portions of microporous ion exchange material, SNL-B, were heated at 170° C. for periods of 2.5 days, 5 days, and 10 days, respectively. Temperatures other than that used in this example will also effect the conversion with time, provided that they are sufficiently high, e.g., 200° C. As shown by the X-ray diffraction patterns in FIG. 2, the microporous phase, SNL-B, is converted to the condensed phase, SNL-A, with time and temperature. To be noted, only the intensity of the peaks in the patterns differ for each phase.

EXAMPLE 3

The standard PCT (product consistency test) leach test, a common technique developed to evaluate chemical durability of nuclear waste form in aqueous environments, was performed on SNL-A, the condensed phase. A sample of the material, 0.2 g, was placed in a hydrothermal bomb with water, 10 g, at 90° C. for 1, 2, 3, 7, and 10 days. After the designated time of heating, each sample was filtered and the leachate solution was analyzed for cesium concentration by AAS. The solid product was analyzed by XRD to determine if any phase changes had occurred. Such leach tests, as well as irradiation experiments, showed SNL-A to be extremely resistant to both structural damage and cesium loss by either method.

Applications

It is envisioned that the microporous phase will be used to (1) selectively sorb a cation of interest, ether be (2) back exchanged with acid to recover the metal, or (3) thermally treated into a stable ceramic form, and then sent to a waste storage facility, if the cation is a radionuclide, with minimized exposure concerns.

The desirable properties of the novel microporous and the condensed phases of the materials of the invention can be used advantageously in a number of different sectors, for instance in environmental clean-up. Because the condensed phase is robust, i.e., chemically, mechanically, and thermally stable, it can be used in the government defense waste clean-up at various sites in the country. Many of these are sites that have separation needs in extreme pH conditions with a wide variety of competing cations. To illustrate, the microporous phase of the new materials has shown selectivity for divalent strontium ions with competing sodium ions at a pH of 2. The materials are also applicable to private industrial needs in environmental clean-up by separations for Resource Conservation Recovery Act (RCRA) heavy metals, such as chromium, nickel, and lead, and for other naturally occurring metals, including thorium.

Also, since thin film membranes have been successfully synthesized from novel inorganic molecular sieves, it is contemplated that the knowledge and experience in this field can easily be applied to the molecular sieve of this invention. This would, of course, be of great interest to the chemical and the petroleum refining industries.

Although the invention has been described with preferred and illustrative embodiments, it will be appreciated by those skilled in the art that additions, modifications, substitutions, and deletions may be made without departing from the spirit and the scope of the invention defined in the appended claims.

REFERENCE

More data on the nature and properties of the novel compounds of the invention can be found in the following literature article, which is hereby incorporated by reference into this specification:

M. Nyman et al., "New crystalline silicotitanate (CST) waste forms: hydrothermal synthesis and characterization of Cs—Si—Ti—O phases", Mat. Res. Symp. Proc., 556, 71–78 (1999). (Note: This article disclosed much of the invention. However, Volume 556 was released to the public around Jan. 5, 2000.)

What is claimed is:

1. A crystalline microporous structure having the formula $Cs_3TiSi_3O_{9.5}\cdot 3H_2O$.

2. A process for the sorption of divalent radionuclide ions from an aqueous solution comprising contacting said aqueous solution with the microporous compound of claim 1.

3. A process for the sorption of divalent radionuclide ions from a hydrocarbon solution comprising contacting said aqueous solution with the microporous compound of claim 1.

4. The process of claim 2, wherein the radionuclide is strontium.

5. The process of claim 2, wherein the radionuclide is thorium.

6. A process for the sorption of divalent metal ions from an aqueous solution comprising contacting said aqueous solution with the microporous compound of claim 1.

7. The process of claim 6, wherein the metals belong to the class consisting of chromium, nickel, lead, copper, cobalt, zinc, cadmium, barium, mercury, and mixtures thereof.

8. A condensed crystalline compound having the formula $Cs_2TiSi_6O_{15}$.

9. The compound of claim 8 containing sorbed strontium ions.

10. The compound of claim 8 containing sorbed thorium ions.

11. The compound of claim 8 containing sorbed divalent metal ions.

\* \* \* \* \*